United States Patent [19]

Lagier et al.

[11] Patent Number: 4,850,881
[45] Date of Patent: Jul. 25, 1989

[54] ELECTRICAL TRANSMISSION RING ASSEMBLY DISPOSED BETWEEN THE STEERING COLUMN AND THE STEERING WHEEL OF AN AUTOMOBILE VEHICLE

[75] Inventors: Daniel Lagier, Nanterre; Jean-Pierre Auffray, Andeville, both of France

[73] Assignee: Jaeger, Levallois-Perret, France

[21] Appl. No.: 99,799

[22] Filed: Sep. 22, 1987

[30] Foreign Application Priority Data

Sep. 23, 1986 [FR] France .................. 86 13274
Mar. 24, 1987 [FR] France .................. 87 04078

[51] Int. Cl.$^4$ ........................... H01R 39/02
[52] U.S. Cl. ........................... 439/22; 439/15
[58] Field of Search .............. 439/15, 18, 20, 22, 439/28, 29

[56] References Cited

U.S. PATENT DOCUMENTS

3,544,949 12/1970 Emelianovich .................. 439/22
3,997,224 12/1976 Ogawa et al. .................. 439/15

Primary Examiner—Frank Gonzalez
Assistant Examiner—John Ngo

[57] ABSTRACT

A transmission ring assembly adapted to be mounted between the steering column and the steering wheel an automobile vehicle provides an electrical connection between a control switch mounted on the steering wheel and a device controlled by the switch. It comprises a bush fixed to the steering column and a first series of conductive rings fastened to the bush. A base member is mechanically attached to the steering wheel and a second series of conductive rings fastened to the base member cooperate electrically with the rings of the first series. Each pair of contacts formed by respective rings from the first and second series is insulated from an adjacent pair of contacts. Each ring of the first or second series comprises two concentric annuli electrically and mechanically joined at at least two points on a common diameter. In this way the connection and drive/retention functions of each ring are made separate from its electrical contact function.

30 Claims, 7 Drawing Sheets

FIG_1

FIG_2

FIG_5

FIG_6

ELECTRICAL TRANSMISSION RING ASSEMBLY DISPOSED BETWEEN THE STEERING COLUMN AND THE STEERING WHEEL OF AN AUTOMOBILE VEHICLE

BACKGROUND OF THE INVENTION

1. Field of the Invention

The present ivention concerns an electrical transmission ring assembly designed to be mounted between the steering column and the steering wheel of an automobile vehicle in order to provide a rotational electrical connection between the switch controlling various functions placed on the steering wheel and the receiving units of the devices to be controlled.

2. Description of the Prior Art

In current automobile vehicles the driver is provided with an increasingly large number of electrical and electronic devices (onboard computer, radio, cruise control, etc.) the controls for which, complementing the conventional devices (turn indicators, lighting, windshield wipers, etc) are placed on the dashboard and around the steering wheel. It is not always easy to operate all these controls, especially when the vehicle is moving, in which case it can even be hazardous.

With a view to bringing all of the aforementioned functions together on the steering wheel, within easy reach of the driver, it has been proposed to employ transmission rings consisting of a first series of conductive rings fastened to a bush fixed to the steering column and cooperating with a second series of conductive rings fastened to a base member in turn attached to so as to rotate with the steering wheel, each pair of contacts formed by one ring from each of the two series being separated from adjacent pairs by means of an insulative member.

For a more detailed description of the aforementioned transmission ring assembly reference may be had to published European Patent Application No. 0150644. Although the transmission ring assembly as previously described makes it possible to enhance substantially the functioning of known transmission systems as used heretofore, the significant increase in the number of transmission paths has resulted in the fact that the making of connections from conductive wires to the conduction tracks eventually gives rise to problems with the mechanical durability of the aforementioned conduction tracks because of mechanical stresses exerted by the electrical conductors connecting the receiving units or effectors to one or other of the rings of the first or second series, by virtue of the large number of to-and-fro rotation movements made by the driver in use.

An object of the present invention is to remedy the aforementioned disadvantages through the use of a transmission ring assembly in which the connection and contact functions of each conductive ring in each of the first and second series are substantially separated.

Another object of the present invention is the use of a transmission ring assembly having significantly enhanced reliability, both mechanically and electrically, as compared with prior art systems.

A further object of the present invention is to simplify the implementation of a transmission ring assembly in accordance with the invention by virtue of the inherent design of the conductive rings of the first and second types.

SUMMARY OF THE INVENTION

In one aspect, the present invention consists in a transmission ring assembly adapted to be mounted between the steering column and the steering wheel of an automobile vehicle to provide an electrical connection between a control switch mounted on said steering wheel and a device controlled by said switch, said assembly comprising a bush adapted to be fixed to said steering column, a first series of conductive rings fastened to said bush, a base member adapted to be mechanically attached to said steering wheel, a second series of conductive rings fastened to said base member and adapted to cooperate electrically with said rings of said first series, and means for electrically insulating each pair of contracts formed by a respective ring from said first series and a respective ring from said second series from an adjacent pair of contacts, in which assembly each ring of said first or second series comprises two concentric annuli electrically and mechanically joined at at least two points on a common diameter whereby each ring has its connection and drive/retention functions separated from its electrical contact function.

In another aspect, the present invention consists in a conductive ring adapted to form part of a transmission ring assembly as defined in the preceding paragraph, which conductive ring is adapted to constitute a ring of said first series and comprises:

a first annulus adapted to form a contact track which contacts a corresponding contact track on a ring of said second series, a second annulus inside said first annulus adapted to form a connection track and electrically and mechanically joined to said first annulus at two diametral attachment points, and at least one positioning lug and a connecting tab on its inside periphery.

In a further aspect, the present invention consists in a conductive ring adapted to form part of a transmission ring assembly as defined hereinabove, which conductive ring is adapted to constitute a ring of said second series and comprises:

a first annulus adapted to form a contact track which contacts a corresonding contact track on a ring of said first series, a second annulus outside said first annulus, adapted to form a connection track and electrically and mechanically joined to said first annulus at two diametral attachment points, and on its outside periphery, two positioning lugs disposed on a diameter and a connecting tab.

In a still further aspect the present invention consists in a conductive ring adapted to form part of a conductive ring assembly as defined hereinabove, which conductive ring is adapted to constitute a ring of said third series and comprises:

a first annulus adapted to form two opposed contact tracks which contact a corresponding contact track on a ring of said first series, and a second annulus outside said first annulus, adapted to form a connection track and electrically and mechanically joined to said first annulus at two diametral attachment points and comprising on its outside periphery two positioning lugs disposed on a diameter and a connecting tab.

The invention finds non-exclusive applications in the fields of automobile technology, aeronautical engineering and electromechanical construction in general.

3

In will be better understood from the following description given by way of example only and with reference to the appended drawings.

BRIEF DESCRIPTION OF THE DRAWINGS

FIG. 3b1 is a plan view of a conductive ring designed to form part of a first series of rings in the transmission ring assembly in accordance with the invention.

FIG. 3b2 is a cross section along the line D—D of FIG. 3b1.

FIG. 3c1 is a plan view of a conductive ring designed to form part of a second series of rings in the transmission ring assembly in accordance with the invention.

FIG. 3C2 is a cross section along the line D—D of FIG. 3C1.

FIG. 3d1 is a plan view of a conductive ring designed to form part of a third series of rings in the transmission ring assembly in accordance with the invention.

FIG. 3d2 is a cross section along the line D—D of FIG. 3d1.

FIG. 3e1 shows the specific arrangement of the conductive rings of the first, second and third series in cross-section on the line AC in FIG. 2.

FIG. 3e2 is a fragmentary, sectional view of the ring 1 and 2 illustrated of FIG. 3e1.

FIG. 4a is a plan view of a conductive ring designed to constitute a new series of rings in the transmission ring assembly in accordance with the invention and a front view of the section DD of this ring.

FIG. 4b is a cross section along the line D—D of FIG. 4a.

DESCRIPTION OF THE PREFERRED EMBODIMENT

The electrical transmission ring assembly which is the subject matter of the invention will firstly be described with reference to FIG. 1.

Figures 1, 2:
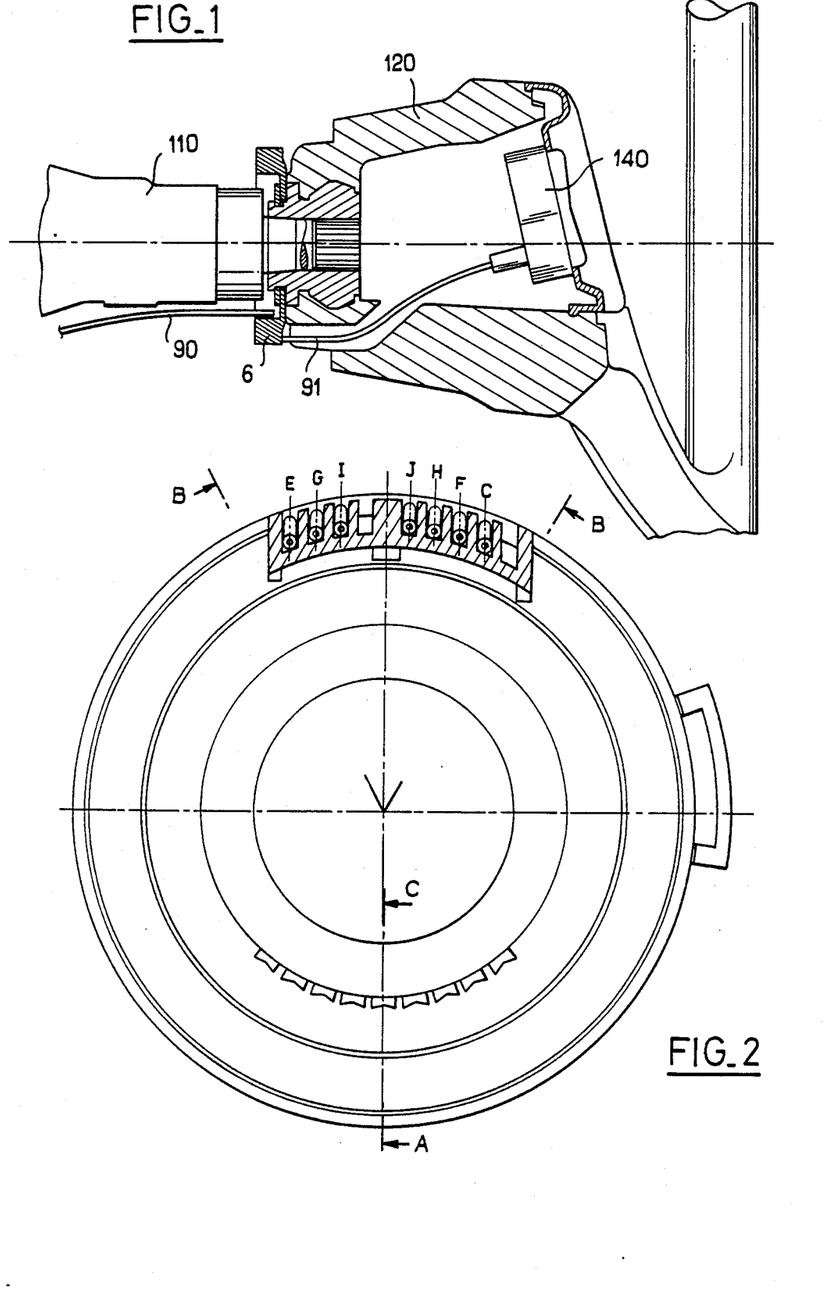
FIG. 1 is a view in cross-section of a transmission ring assembly in accordance with the present invention mounted on the steering wheel of an automobile.
FIG. 2 shows a transmission ring assembly in accordance with the invention in plan view.

In the aforementioned figure, the electrical transmission ring assembly in accordance with the invention is mounted between the steering column denoted 110 in FIG. 1 and the steering wheel denoted 120 of an automobile vehicle to provide a rotational connection between a control switch denoted 140 mounted on the steering wheel, near the hands of the driver, and the receiving units of the devices to be controlled.

The electrical connection between the control switch 140 and the electrical transmission ring assembly mounted on a base member 6 is provided by means of a bundle of wires denoted 91, the transmission ring assembly being further connected by a bundle of wires 90 to the receiving units of the devices to be controlled.

For a more detailed description of the mounting of the electrical transmission ring assembly that is the subject matter of the invention between the steering column 110 and the steering wheel 120 of an automobile vehicle reference may be had to the published European Patent Application No. 0150644 previously mentioned.

A more detailed description of the transmission ring assembly that is the subject matter of the invention will be given with reference to FIGS. 2 and 3a.

Figure 3A:
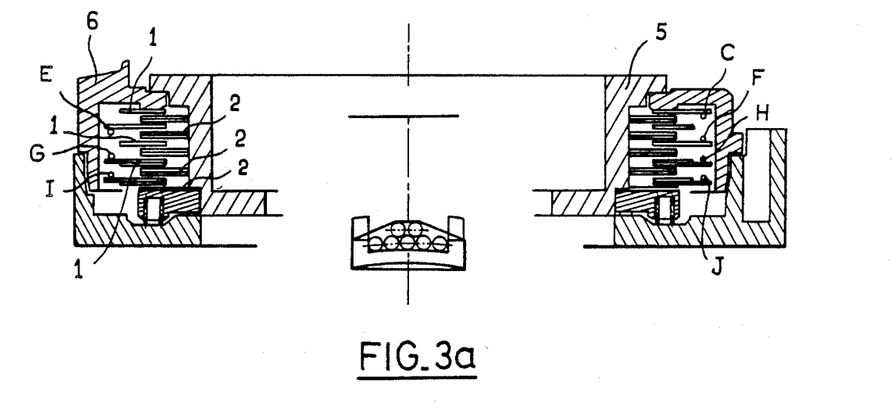
FIG. 3a shows a transmission ring assembly in accordance with the present invention in cross-section on the line BB in FIG. 2.

In the aforementioned figures the transmission ring assembly in accordance with the invention comprises a first series of n rings denoted 2 in FIG. 3a that are electrically conductive and fastened to a bush 5 fixed to the steering column 110. The rings 2 cooperate electrically with a second series of n rings denoted 1, also electrically conductive, fastened to so as to rotate with a base member 6 mechanically attached to the steering wheel as shown in FIGS. 1 and 3a. Each pair of contacts formed by one ring from each of the two series (rings 2 of the first series and rings 1 of the second series) is electrically insulated from the adjacent pair.

As is clearly seen in FIGS. 3b and 3c, in accordance with the invention each conductive ring 1 and 2 of the first and second series of rings, respectively, is made up of two concentric annuli denoted 20 and 21, respectively 10 and 11 on the aforementioned FIGS. 3b and 3c. The concentric annuli 20, 21 and 10, 11 are respectively joined electrically and mechanically at at least two connecting points 22, 23 and 12, 13 disposed on one of their common diameters. The structure of the rings 2 and 1 previously described, as defined herein, makes it possible to separate for each ring the connection and mechanical drive/retention functions, on the one hand, and the electrical contact function, on the other hand. Thus the rings 2 and 1 constituting the rings of the first and second series may during use retain a substantially constant flexibility on the axial direction which is homogeneous over substantially all of their periphery.

As will be described in a particularly detailed way in the description hereinafter, one of the annuli, relatively rigid in the axial direction, may be advantageously assigned to implementing the electrical contact function whereas the other annulus, which is more flexible, is more specifically intended to implement the connection and drive/retention function for each of the rings in question.

The concentric annuli 20, 21 and 10, 11 advantageously have different dimensions, the annulus 21 or respectively 11 of each ring having a smaller radial dimension, less than one third of the radial dimension of the corresponding annulus 20 or respectively 10, in order to confer on them the aforementioned relative axial flexibility.

By virtue of one advantageous characteristic of the transmission ring assembly that is the subject matter of the invention, each ring may advantageously comprise on one side a layer denoted 201, 101 of an insulative material such as a varnish or a lacquer. The layers of insulative material are shown enlarged in cross-section on a radial plane DD of FIGS. 3b and 3c in those same figures.

Figures 3B, 3B:
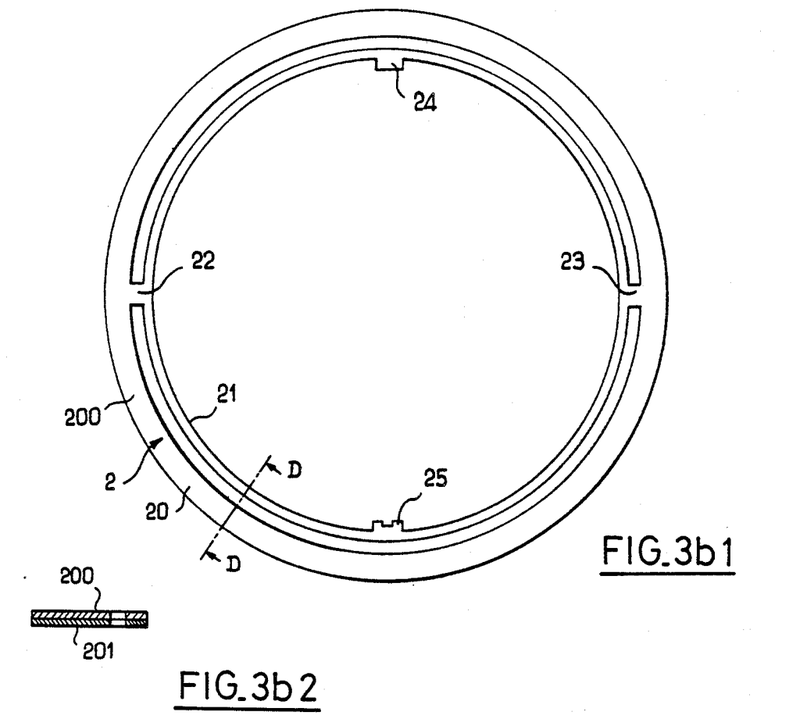
Figures 3C, 3C:
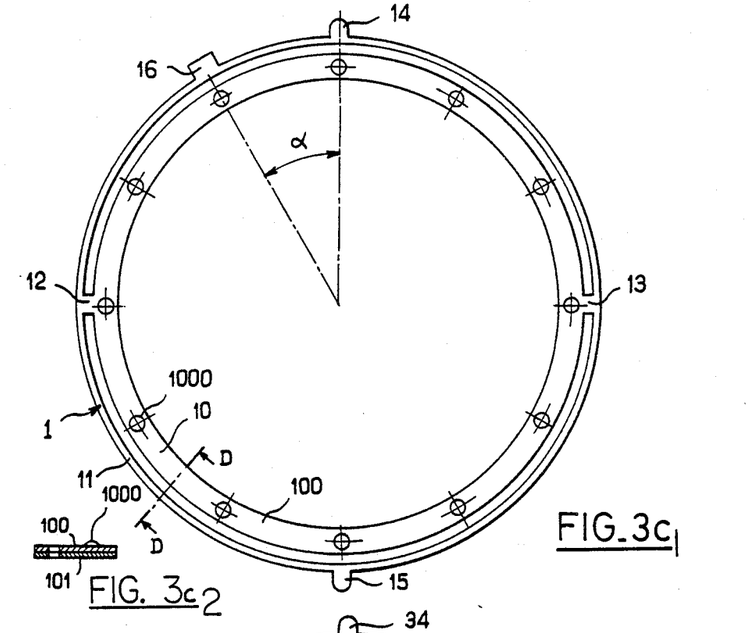
Figures 3D, 3D:
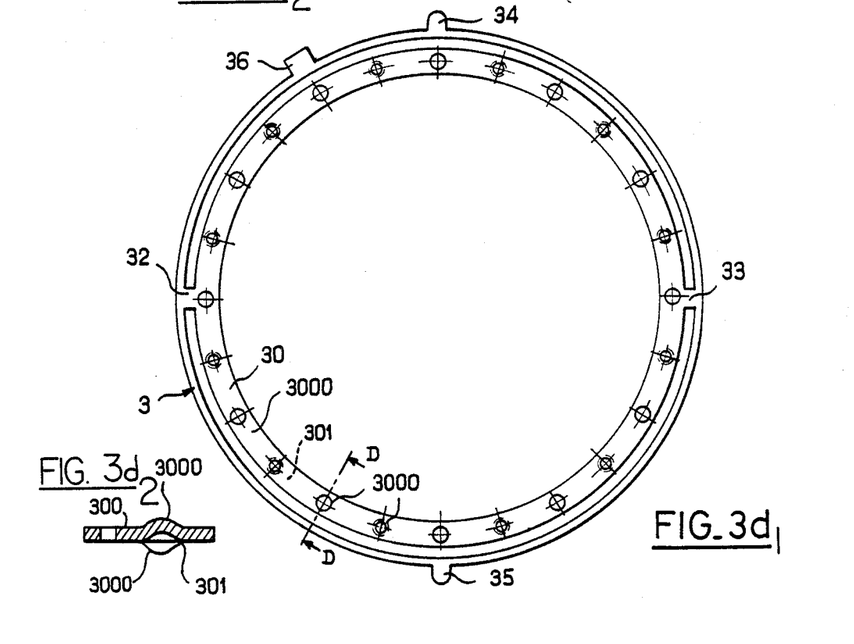
Figures 3E, 3E:
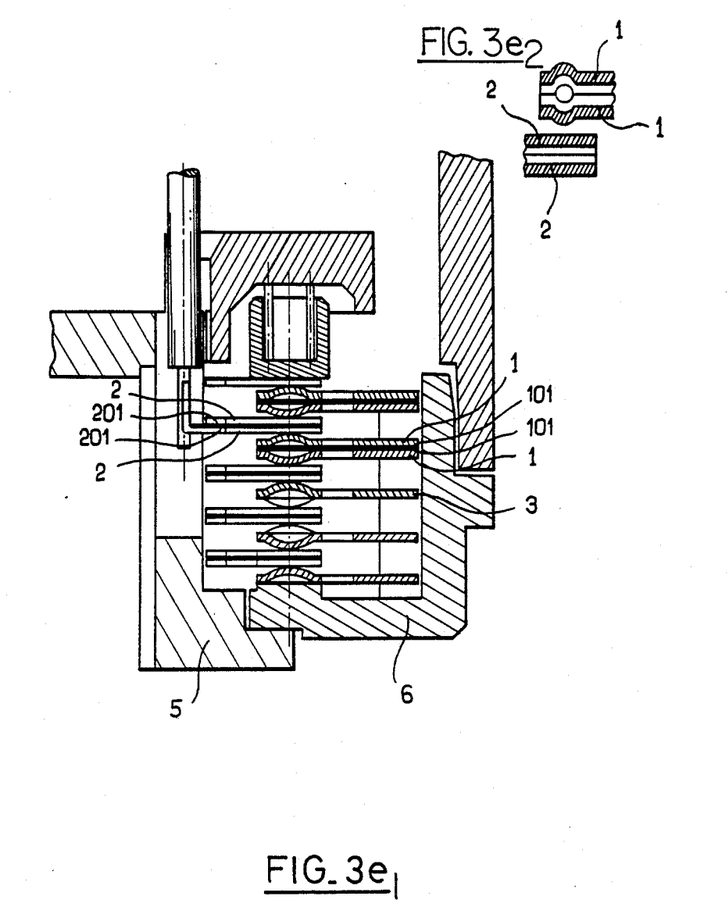

One non-limiting embodiment of the rings 2 of the first series and of the rings 1 of the second series to form the transmission ring assembly that is the subject matter of the invention will be described in more detail with reference to FIG. 3e, which shows a cross-section through FIG. 2. The arrangement shown in FIG. 3e is offered by way of non-limiting example only.

In the aforementioned FIG. 3e, the layer 101, 201 of insulative material of each ring 1, 2 is alternately contained between two rings 1 fastened to so as to rotate with the steering wheel and then between two rings 2 fastened to the steering column. Thus one pair of rings is made up of a ring 2 of the first series in electrical contact with a ring 1 of the second series although two consecutive pairs are of course electrically insulated by two respective insulative layers 101, 201 which are thus brought into contact.

As further appears in FIG. 3e, the transmission ring assembly may advantageously comprise at least one ring 3 of a third series. This ring comprises two opposed contact tracks designed to procure electrical contact between successive rings 1 of the second series, stacked symmetrically relative to the median plane of the ring 3. The specific disposition of the rings 3 of the third series between two consecutive or successive rings of the second series, for example, makes it possible to obtain parallel contact on two successive rings of the aforementioned second series. The use of one or more rings of the third series naturally makes it possible to obtain so-called safety contacts whereby the two contacts in parallel provide a redundant electrical contact for enhanced security.

A more detailed description of the structure of the rings of the first, second and third series will be given with reference to FIGS. 3b, 3c and 3d, respectively.

In FIG. 3b, the conductive ring 2 adapted to form part of a transmission ring assembly in accordance with the invention, the ring 2 constituting one of the first series of rings, comprises a first annulus 20 adapted to form a track in contact with the corresponding contact track of a ring 1 of the second series of rings. The ring 2 further comprises a second annulus 21 inside the first forming a connection track. The second annulus 21 is mechanically and electrically joined to the first annulus at two diametral attachment points 22, 23. The second annulus 21 further comprises at its inside periphery at least one positioning lug 24 and a connnection tab 25.

The first annulus 20 forming a contact track comprises a flat surface 200 defining the aforementioned contact track.

The ring 2 forming part of the first series of rings is advantageously made from a material such as brass.

The conductive ring 1 adapted to form part of the second series of rings as shown in FIG. 3c advantageously comprises a first annulus 10 adapted to form a track in contact with the corresponding contact track of a ring 2 if the first series of rings. The ring 1 further comprises a second annulus 11 outside the first forming a connection track. The second annulus is joined mechanically and electrically to the first annulus at two diametral attachment points 12, 13. It comprises at its outside periphery two positioning lugs 14 and 15 disposed on a diameter and a connecting tab 16. It is to be understood that more than two positioning lugs may be provided. Also, the annulus 11 comprises a connecting tab denoted 16 on its outside periphery.

As will be noted from FIG. 3c, the first annulus 10 comprises a surface 100 forming the contact track and featuring regularly distributed bosses 1000. The bosses 1000 make it possible to procure a better electrical contact between the contact tracks of the rings of the first and second series of rings by locally increasing the contact pressure without significantly increasing the rotational drive torque.

The annulus 1 may advantageously be made from a material such as copper or beryllium. It has been noted that optimum conditions for functioning of the transmission ring assembly in accordance with the invention are obtained with minimal wear when the ring 1 adapted to constitute one of the second series of rings is formed in a material such as copper beryllium alloy with the ring or rings 2 adapted to form the second series of rings made of brass.

By virtue of another advantageous characteristic of the ring 1 adapted to form one of the second series of rings the contact tab 16 is disposed at the outside periphery of the second annulus 11 and offset by a predetermined angle $\alpha$ relative to one of the positioning lugs 14 so as to obtain, on successive stacking of the rings forming the first and second series of rings, an alternating herringbone arrangement of the connecting tabs 16 of the second annulus 11 forming the connection tracks of the rings of the second seris of rings, by simle alternate overturning of the rings forming the first and second series of rings. In FIG. 3c the connecting tab 16 of a ring 1 forming one of the second series of rings stacked under or over the ring shown in the figure is also shown in dashed outline. Thus by successively stacking and turning over the various rings the herringbone arrangement of the connecting tabs is obtained.

It will be understood that in this way the electrical connection of the electrical wires or electrical conductors constituting the bundles of wires 90 and 91 previously described can be made easily, the connection points for the rings of the same series being thus divided between two separate generatrices of the stack of rings of the same series of rings.

It will also be understood that in this way the rings of the same series, while still making it possible to obtain connection points on different generatrices of the stack of rings, can be fabricated by cutting out using the same tool, so that the previous embodiment does not entail any specific problem with regard to fabricating the rings of either series.

Finally, it will be understood that the rings of the first or second series may be obtained by cutting or stamping from a sheet of conductive material, in a material as previously described, comprising on one side only a layer of insulative material such as lacquer or varnish.

As seen in FIG. 3d, the ring 3 adapted to constitute one of the third series of rings advantageously comprises a first annulus 30 adapted to form two opposed tracks 300 and 301 in contact with the corresponding contact track of a ring denoted 2 in FIG. 3e of the first series of rings. The ring 3 further comprises a second annulus 31 outside the first and forming a connection track. The second annulus 31 is mechanically and electrically joined to the first annulus at two diametral attachment points 32, 33. This second annulus 31 comprises at its outside periphery two positioning lugs denoted 34 and 35 in FIG 3d diposed on a diameter and a connecting tab 36.

The positioning/drive lugs 14, 15, 24 and 34, 35 and the connecting tab 24 may then advantageously be placed at the point on the circumference of the corresponding connection track farthest removed from the respective attachment points 12, 13, 22, 23 and 32, 33 in order to maximize the axial flexibility of the aforementioned connection track.

Unlike the rings 2 and 1 respectively of the first and second series the ring 3 adapted to form a ring of the third series does not comprise any layer of insulative material. To the contrary, the opposed contact tracks 300 and 301 are advantageously provided with bosses 3000 regularly distributed along the circumference of the annulus in alternating opposed relationship. FIG. 3d shows an enlarged view of the coresponding section of the ring 3 in cross-section on a radial plane DD.

It will also be noted that the first annuli respectively denoted 20, 10 and 30 adapted to form contact tracks of the rings of the first, second and respectively third series of rings of course have the same radial dimensions, so as to make it possible to superpose them by simple turning over.

In particular, it will be understood that in a stack adapted to constitute a ring assembly in accordance with the invention, the rings of the second type denoted 1 may be replaced with any number of rings 3 of the third type so as to constitute safety contacts or circuits in the case where they are intended to control the essential devices of the vehicle. In particular, the duplicated contact or contacts in parallel obtained in this way may advantageously be used to control safety devices of the vehicle, such as an inflatable safety airbag.

The rings of the same type or the rings 1 forming the second series of rings and the rings 3 forming the third series of rings are stacked alternately in one sense and then the other so that the connection lugs 16 are oriented alternately to the right and then to the left of the diameter passing through the two diametral lugs 14, 15 respectively 34, 35 previously described. The connection tabs 16 of the same type of ring are thus disposed along two generatrices of the stack constituting the ring assembly.

Also, the facing insulated sides of the various rings are fixed relative to each other which makes it possible to reduce the friction forces and hence the drive torque, on the one hand, and to enhance reliability by eliminating wear of the insulation, on the other hand.

A particularly beneficial embodiment of safety contacts as previously described will now be described hereinafer with reference to FIGS. 4 through 7a, 7b. In this embodiment one of the superposed contact rings is eliminated.

Another feature of the embodiment to be described now is the use of a contact ring assembly which by virtue of the aforementioned elimination of one ring and of modifications to the shape of the conductive rings has a significantly reduced overall height, in the direction the rings are stacked.

A further feature of this particular embodiment is that it reduces the manufacturing cost of the transmission ring assemblies because of the reduced cost of fabricating the component parts of the ring assemblies and the reduced time to assemble them.

The conductive ring in this particular embodiment is remarkable in that, being intended to serve the function of a ring of the third series of rings and of a contact ring of the first series to procure a redundant electrical contact between two consecutive rings of first series, the ring comprises a central first annulus which is electrically conductive and constitutes a connection track, an intermediate second annulus circumscribed on the central first annulus and constituting a contact track and an outer third annulus circumscribed on the intermediate second annulus and constituting a contact track. The first, second and third annuli are joined electrically and mechanically at two diametral attachment points. The outer third annulus serves as one of the consecutive rings of the first series connected in parallel in the embodiment of FIGS. 1 through 3e.

The conductive ring of this particular embodiment and the transmission ring assembly fabricated using it find applications in automobile and aeronautical engineering and in mechanical construction in general, and more specifically in controlling automobile safety devices such as inflatable anticollision airbags.

The conductive ring of this particular embodiment adapted to serve the function of a ring of the third series and of a contact ring of the first series in accordance with the embodiments of FIGS. 1 through 3e to procure a redundant electrical contact between two consecutive rings of a first series will first be described with reference to FIG. 4.

Figures 4A, 4B:
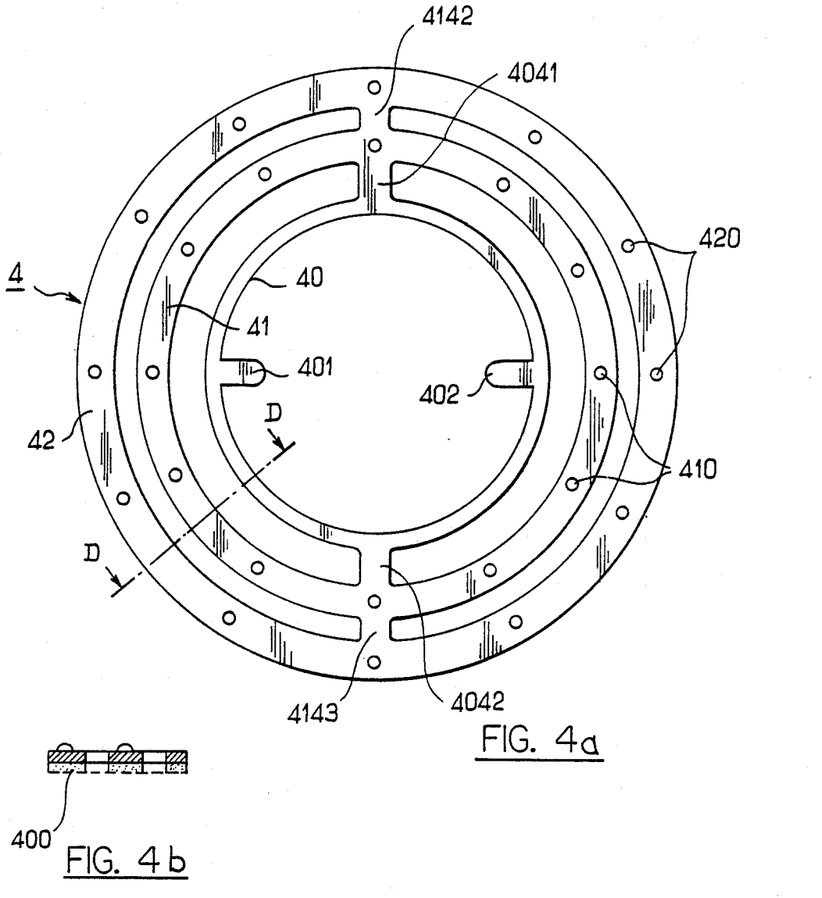

In the aforementioned FIG. 4, the ring in accordance with the invention is referenced 4.

As shown in the aforementioned figure, the ring comprises a central first annulus denoted 40 constituting a connection track and an intermediate second annulus denoted 41 circumscribed on the central first annulus 40 and also constituting a contact track.

An outer third annulus 42 is provided, this being circumscribed on the intermediate second annulus 41 and constituting a contact track. The central first annulus 40, the intermediate second annulus 41 and the outer third annulus 42 are of course made from an electrically conductive material. The first annulus 40, second annulus 41 and third annulus 42 are joined electrically and mechanically at diametral attachment points. These diametral attachment points are respectively denoted 4041, 4042 and 4142, 4143 in FIG. 4.

As will be described in more detail later in the description the outer third annulus 42 serves as one of the consecutive rings of the first series connected in parallel, as in the foregoing description.

One particularly advantageous feature of the conductive ring 4 shown in FIG. 4 is that the intermediate second annulus 41 and the outer third annulus 42 are provided with bosses regularly spaced around the circumference of the annuli, on a common side of the latter. These bosses are respectively denoted 410 and 420 in FIG. 4.

As will also be noted from the aforementioned figure, the central first annulus 40 comprises two positioning lugs forming connecting tabs, these positioning lugs being disposed on a diameter and directed towards the center of symmetry of the central annulus 40.

Figure 5:
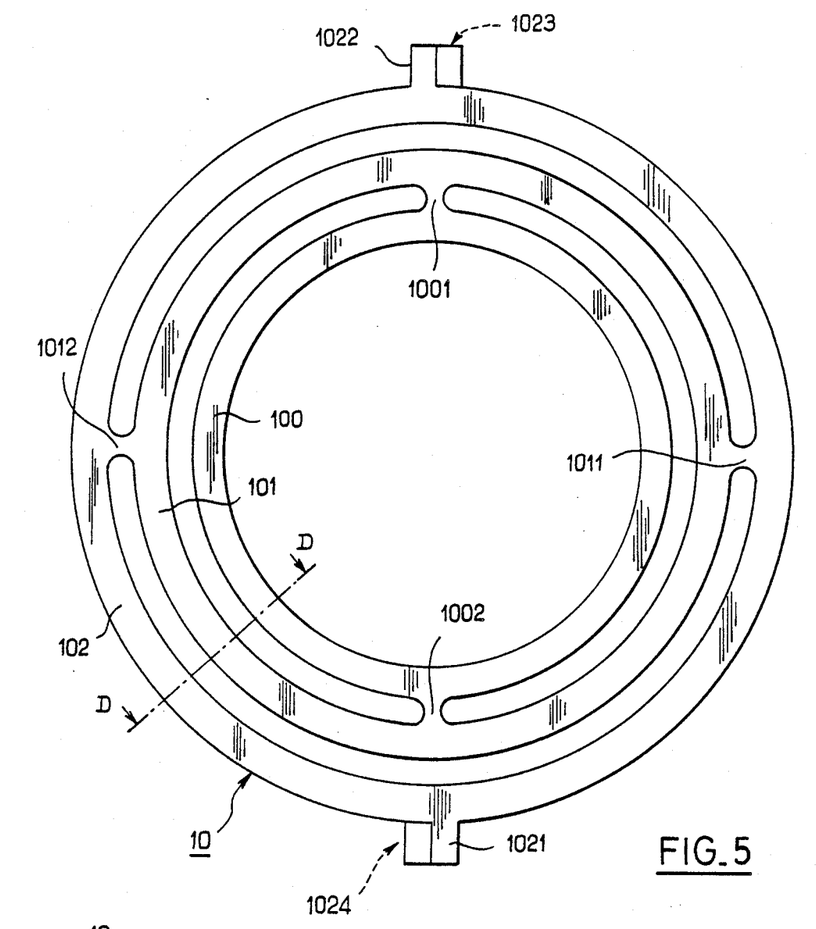
FIG. 5 is a plan view of ring serving as a ring of the second series.

In order to connect the ring 4 with a ring 10 serving the function of a ring of the second series in the embodiment of FIGS. 1 through 3e, the rings on the second series in this embodiment being described by way of non-limiting example only as attached to the steering wheel, the ring 10 comprises, as shown in FIG. 5, a central first annulus 100 forming a contact track. This central annulus 100 has a diameter and a width identical to the corresponding dimensions of the intermediate second annulus 41 of the ring 4 previously described. Also, the ring 10 comprises an intermediate second annulus denoted 101 having a diameter and a width identical to the corresponding dimensions of the outer third annulus 42 of the ring 4. The central first annulus 100 and the intermediate second annulus 101 are adapted to come in service into face-to-face relationship with the intermediate annullus 41 and outer annulus 42, respectively, of the ring 4 as will be described later in this description.

Also, an outer third annulus denoted 102 is circumscribed on the intermediate second annulus 101 and the first annulus 100, the second annulus 101 and third annulus 102 are joined electrically and mechanically at diametral attachment points respectively denoted 1001, 1002 and 1011, 1012.

As will be noted from FIG. 5, the diametral attachment points 1001, 1002, 1011 and 1012 are respectively offset in pairs at 90° so as to secure good distribution of the loads on the set of annuli consisting of the first annulus 100, the second annulus 101 and third annulus 102 on rotation of or friction between the corresponding annuli. It will of course be noted that the outer third annulus 102 then serves as a connecting track, connecting tabs 1021 and 1022 being provided to this end.

Figure 6:
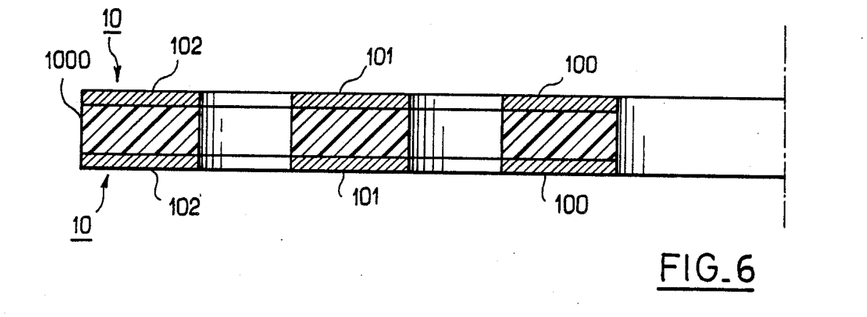
FIG. 6 is a front view of the section DD of the ring from FIG. 2 in a particularly advantageous embodiment enabling successive stacking of a pair constituted by a ring as in FIG. 1 and a ring as in FIG. 2, two of these rings being successively superposed.

In order to secure the successive stacking of a pair consisting of a ring 4 and a ring 10, two rings 10 and two rings 4 being then successively superposed to constitute a transmission ring assembly in accordance with the invention, as will be described hereinafter, two rings 10 are formed in face-to-face relationship on the opposite sides of an insulative material, as shown in FIG. 6 in particular. In the aforementioned figure there are shown in cross-section on the line DD in FIG. 5 the first annulus 100, the second annulus 101 and the third annulus 102.

According to one advantageous characteristic the two rings 10 formed on an insulative material consist in a double-sided printed circuit. The first annulus 100, the second annulus 101 and the third annulus 102 are then in respective face-to-face relationship as shown in FIG. 6.

As will be noted from FIG. 5, moreover, the outer third annuli 102 comprise at their periphery two diametrally opposed mechanical drive and electrical connection tabs denoted 1021, 1022 and 1023, 1024. In order to facilitate the connection of electrical wires from the control units to the tabs 1021, 1022, 1023 and 1024, the tabs 1023 and 1024 being of course on the opposite side to the tabs 1021 and 1022, as shown schematically by the dashed line arrows associated with the reference numbers 1023 and 1024, the latter are advantageously offset relative to the corresponding connecting tabs 1022 and 1021.

Figure 7A:
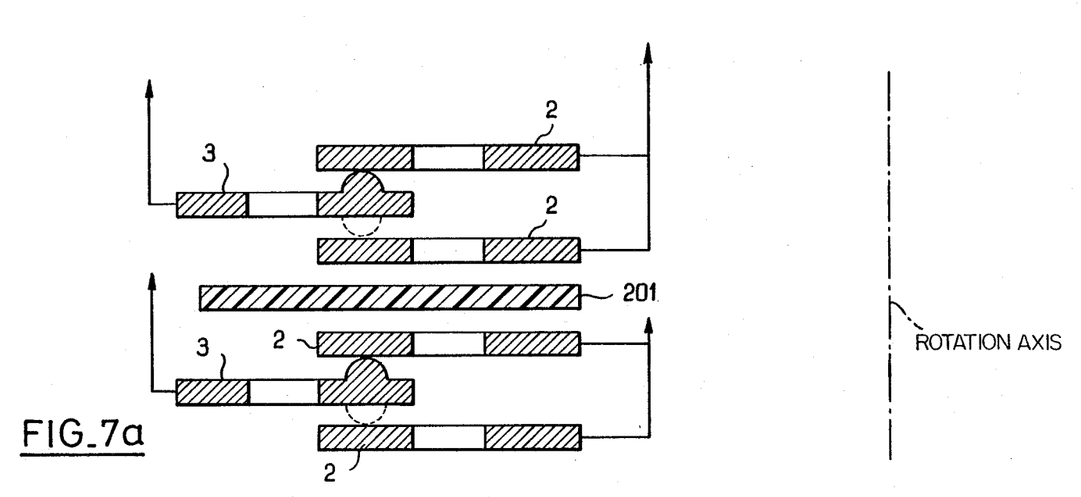
FIG. 7a is a view in cross-section through a stack forming a safety parallel connection in accordance with the present invention.

The transmission ring assembly obtained by stacking the various rings previously described will now be described in more detail with reference to FIGS. 7a and 7b, where FIG. 7a shows a stack of rings in accordance with the invention providing a safety electrical contact by connecting in parallel two successive rings through the intermediary of a ring of a third series, FIG. 7a showing in more detail the embodiment of the stack constituting the transmission ring assembly as shown in FIG. 3e previously described. FIG. 7a shows to a larger scale a cross-section through the stack as shown in FIG. 3e previously described and comprising in succession, in a stacking direction, a ring 2 of the first series, a ring 3 of the second series and a ring 2 of the first series, the two rings 2 of the first series being connected in parallel to constitute a safety contact on the aforementioned ring 3 of the third series. A sheet 201 of insulative material is then stacked on the last ring 2 of the first series and then a new stack of successive rings comprising a ring 2 from the first series, a ring from the third series and a further ring 2 from the first series connected in parallel with the ring 2 of the first series is stacked on the sheet 201 of insulative material. Note in particular that in the case of the provision of two safety contacts as shown in FIG. 7a, and as described previously, it is therefore necessary to stack seven successive elements, which of course entails signficant labor time and non-negligible facbrication costs. The pattern shown in FIG. 7a can be repeated by successive stacking, a further sheet 201 of insulative material being then stacked with the succession of two rings 2 of the first series adjacent a ring 3 of the third series being then repeated.

Figure 7B:
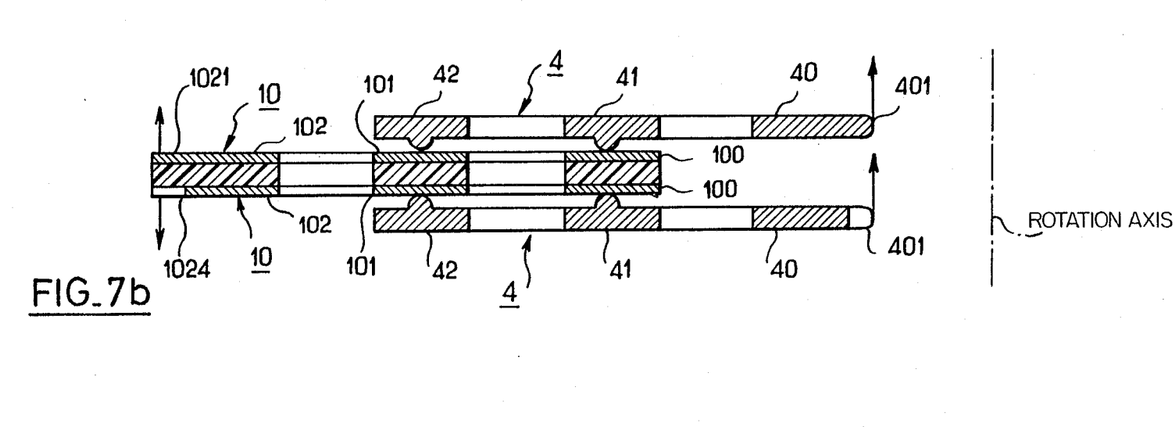
FIG. 7b is a view in cross-section through the stack forming a safety parallel connection in accordance with the present invention.

The stacking of the rings 4 and 10 in accordance with the invention to obtain safety contacts in a trnsmission ring assembly in accordance with the invention is shown in FIG. 7b. The double-sided printed circuit comprising two rings 10 in face-to-face relationship as shown in FIG. 3 is associated with a first ring 4 and a second ring 4, the intermediate track or annulus 41 and outer track or annulus 43 of each ring 4 being respectively brought into face-to-face relationship with the inner track 100 and the intermediate track 101 of the corresponding ring 10. The electrical connections of the electrical cables or conductors connected to the control units are then made to the corresponding connecting tabs 401 and 402 and 1021 and 1024, respectively. To obtain two safety contacts, each safety contact consisting of a ring 4 and a ring 10 and the parallel connection of each safety contact being obtained by the annuli 100, 101 and 41, 42 which are respectively connected in parallel, it is then necessary, for the embodiment shown in FIG. 7b, to stack three elements, that is to say a double-sided printed circuit comprising two rings 10 and two rings 4 as described with reference to FIG. 7b. It is, of course, also possible to repeat the pattern shown in FIG. 7b by successive stacking of arrangements consisting of a double-sided printed circuit comprising two rings 10 and two rings 4 in face-to-face relationship, two successive rings 4 being then separated in this stack by a layer of insulative material not shown in the drawing. The layer of insulative material may advantageously be formed by a sheet of mylar. In accordance with a non-limiting and more advantageous embodiment, as shown to an enlarged scale in FIG. 1 in particular, the rings 4 may comprise on the surface of the first, second and third annuli opposite the bosses 410, 420 a coating 400 of insulative material. In this case the layer of insulative material separating two successive rings 4 is then formed by the insulative coatings 400 of the two rings 4 in face-to-face relationship.

Regarding the transmission ring assembly fabricated in accordance with the invention using rings 4 and rings 10 as previously described, it is of course possible to assemble the resulting transmission ring assembly in such a way that the central parts of the rings 4 are attached to the steering wheel, for example, and move therewith or, to the contrary, in such a way that the same central parts, that is to say the positioning lugs 401 and 402, are fixed relative to the steering column tube, either assembly being feasible depending on the design of the vehicle. In order to obtain a good electrical contact at the level of the bosses disposed on the contact stacks of rings 4 it is advantageous to provide one or more spring members for securing the ring assembly consisting of the stack as previously described, this spring member or members exerting sufficient force to obtain a good electrical contact at the level of the bosses.

There has therefore been described a particularly advantageous embodiment of the present invention in the form of a conductive ring for an electrical transmission ring assembly mounted between the steering column and the steering wheel of an automobile vehicle.

The aforementioned embodiment, especially in the case where a safety contact is obtained by connecting two contacts in parallel to control safety devices of a vehicle such as protective inflatable airbags or the like, enables of course simplified implementation of this type of safety contact relative to the embodiment as previously described, in that, as well as making it possible to reduce the number of elements to be used or stacked, it also makes it possible to economize on four connecting wires and two soldered joints, as well as simplifying the implementation of each safety contact.

Also, the use of the rings as previously described is particularly facilitated in that the technology for producing printed circuits enables problem-free mass production.

The electrical transmission ring assembly in accordance with the invention mounted between the steering column and the steering wheel of an automobile vehicle makes it possible to secure a rotational connection between a control switch mounted on the steering wheel and the receiving units of the devices to be controlled. It makes it possible to obtain highly secure and highly reliable functioning. The great security and the great reliability of functioning just mentioned are due to the specific structure of the rings constituting the transmission ring assembly in accordance with the invention, in which rings the electrical connection function and the function of providing contact between the rings are made separate.

We claim:

1. Transmission ring assembly adapted to be mounted between the steering column and the steering wheel of an automobile vehicle to provide an electrical connection between a control switch mounted on said steering wheel and a device controlled by said switch, said assembly comprising a bush adapted to be fixed to said steering column, a first series of conductive rings fastened to said bush, a base member adapted to be mechanically attached to said steering wheel, a second series of conductive rings fastened to said base member and adapted to cooperate electrically with said rings of said first series, and means for electrically insulating each pair of contacts formed by a respective ring from said first series and a respective ring from said second series from an adjacent pair of contacts, in which assembly each ring of said first or second series comprises two concentric annuli electrically and mechanically joined at at least two points on a common diameter whereby each ring has its connection and drive/retention functions separated from its electrical contact function.

2. Transmission ring assembly according to claim 1, wherein each ring comprises on one side a layer of insulative material.

3. Transmission ring assembly according to claim 2, wherein said layer of insulative material is contained alternately between two rings constrained to rotate with said steering wheel and then between two rings fastened to said steering column.

4. Transmission ring assembly according to claim 1, further comprising at least one ring constituting a third series of rings and comprising two opposed contact tracks adapted to procure electrical contact between two successive rings of said first series stacked symmetrically relative to the median plane of said at least one ring constituting said third series of rings.

5. Conductive ring adapted to form part of a transmission ring assembly adapted to be mounted between the steering column and the steering wheel of an automobile vehicle to provide an electrical connection between a control switch mounted on said steering wheel and a device controlled by said switch, said assembly comprising a bush adapted to be fixed to said steering column, a first series of conductive rings fastened to said bush, a base member adapted to be mechanically attached to said steering wheel, a second series of conductive rings fastened to said base member and adapted to cooperate electrically with said rings of said first series, and means for electrically insulating each pair of contacts formed by a respective ring from said first series and a respective ring from said second series from an adjacent pair of contacts, in which assembly each ring of said first or second series comprises two concentric annuli electrically and mechanically joined at at least two points on a common diameter whereby each ring has its connection and drive/retention functions separated from its electrical contact function, which conductive ring is adapted to constitute a ring of said first series and comprises:

a first annulus adapted to form a contact track which contacts a corresponding contact track on a ring of said second series, a second annulus inside said first annulus adapted to form a connection track and electrically and mechanically joined to said first annulus at two diametral attachment points, and at least one positioning lug and a connecting tab on its inside periphery.

6. Conductive ring according to claim 5, wherein said first annulus forming a contact track comprises a flat surface defining said contact track.

7. Conductive ring according to claim 5, made from brass.

8. Conductive ring according to claim 5, wherein said first annuli adapted to from contact tracks of said rings of said first and second series of rings have the same dimensions whereby they can be superposed by turning them over.

9. Conductive ring according to claim 5, wherein said annuli forming said connection and drive/retention tracks are of relatively limited size in the radial direction, having less than one third the radial dimension of the corresponding annulus forming an electrical contact track, whereby sufficient relative axial flexibility is conferred upon them.

10. Conductive ring according to claim 5, wherein said central first annulus comprises two positioning lugs forming connection tabs disposed on a diameter and directed towards its center of symmetry.

11. Conductive ring adapted to form part of a transmission ring assembly adapted to be mounted between the steering column and the steering wheel of an automobile vehicle to provide an electrical connection between a control switch mounted on said steering wheel and a device controlled by said switch, said assembly comprising a bush adapted to be fixed to said steering column, a first series of conductive rings fastened to said bush, a base member adapted to be mechanically attached to said steering wheel, a second series of conductive rings fastened to said base member and adapted to cooperate electrically with said rings of said first series, and means for electrically insulating each pair of contacts formed by a respective ring from said first series and a respective ring from said second series from an adjacent pair of contacts, in which assembly each ring of said first or second series comprises two concentric annuli electrically and mechanically joined at at least two points on a common diameter whereby each ring has its connection and drive/retention functions separated from its electrical contact function, which conductive ring is adapted to constitute a ring of said second series and comprises:

a first annulus adapted to form a contact track which contacts a corresponding contact track on a ring of said first series, a second annulus outside said first annulus, adapted to form a connection track and electrically and mechanically joined to said first annulus at two diametral attachment points, and on its outside periphery, two positioning lugs disposed on a diameter and a connecting tab.

12. Conductive ring according to claim 11, wherein said first annulus comprises a surface defining said contact track on which are regularly distributed bosses.

13. Conductive ring according to claim 11, made from copper beryllium alloy.

14. Conductive ring according to claim 11, wherein said connecting tab on the outside periphery of said second annulus is offset by a predetermined angle relative to one of said positioning lugs whereby, on consecutive stacking of the rings forming said first and second series alternating overturning of said rings forming said first and second series procures an alternating herringbone arrangement of said connecting tabs of said second annulus forming said connecting track of said rings of said second series.

15. Conductive ring according to claim 11, wherein said first annuli adapted to form contact tracks of said rings of said first and second series of rings have the same dimensions whereby they can be superposed by turning them over.

16. Conductive ring according to claim 11, wherein said annuli forming said connection and drive/retention tracks are of relatively limited size in the radial direction, having less than one third the radial dimension of the corresponding annulus forming an electrical contact track, whereby sufficient relative axial flexibility is conferred upon them.

17. Conductive ring according to claim 11, wherein said central first annulus comprises two positioning lugs forming connection tabs disposed on a diameter and directed towards its center of symmetry.

18. Conductive ring adapted to form part of a transmission ring assembly adapted to be mounted between the steering column and the steering wheel of an automobile vehicle to provide an electrical connection between a control switch mounted on said steering wheel and a device controlled by said switch, said assembly comprising a bush adapted to be fixed to said steering column, a first series of conductive rings fastened to said bush, a base member adapted to be mechanically attached to said steering wheel, a second series of conductive rings fastened to said base member and adapted to cooperate electrically with said rings of said first series, and means for electrically insulating each pair of contacts formed by a respective ring from said first series and a respective ring from said second series from an adjacent pair of contacts, in which assembly each ring of said first or second series comprises two concentric annuli electrically and mechanically joined at at least two points on a common diameter whereby each ring has its connection and drive/rentention functions separated from its electrical contact function, the assembly further comprising at least one conductive ring constituting a third series of rings and comprising two opposed contact tracks adapted to procure electrical contact between two successive rings of said first series stacked symmetrically relative to the median plane of said at least one ring constituting said third series of rings, which conductive ring is adapted to constitute a ring of said third series and comprises:

a first annulus adapted to form two opposed contact tracks which contact a corresponding contact track on a ring of said first series, and a second annulus outside said first annulus, adapted to form a connection track and electrically and mechanically joined to said first annulus at two diametral attachment points and comprising on its outside periphery two positioning lugs disposed on a diameter and a connecting tab.

19. Conductive ring according to claim 18, wherein said opposed contact tracks comprises bosses regularly distributed along the circumference of said annulus in alternating opposed relationship.

20. Conductive ring according to claim 18, wherein said first annulus adapted to form contact tracks of said rings of said first, second and third series of rings have the same dimensions whereby they can be superposed by turning them over.

21. Conductive ring according to claim 18, wherein said annuli forming said connection and drive/retention tracks are of relatively limited size in the radial direction, having less than one third the radial dimension of the corresponding annulus forming an electrical contact track, whereby sufficient relative axial flexibility is conferred upon them.

22. Conductive ring according to claim 18, adapted to function as a ring of said third series of rings and as a contact ring of said first series of rings in order to procure a redundant electrical contact between two consecutive rings of said first series and comprising:

a central first annulus forming a connection track, an intermediate second annulus circumscribed on said central first annulus and forming a contact track, and an outer third annulus circumscribed on said intermediate second annulus and constituting a contact track, said first, second and third annuli being electrically and mechanically joined at diametral attachment points and said outer third annulus serving as one of the consecutive rings of said first series connected in parallel.

23. Conductive ring according to claim 22, wherein said intermediate second annulus and said outer third annulus comprise bosses regularly distributed along the circumference of said annuli on a same side thereof.

24. Conductive ring according to claim 22 wherein in order to connect said ring of said third series to a ring serving as a ring of said second series fastened to said steering wheel said ring of said second series comprises:

a central first annulus forming a contact track, said central annulus having a diameter and a width identical to the corresponding dimensions of said intermediate second annulus of said ring of said third series, an intermediate second annulus having a diameter and a width identical to the corresponding dimensions of said outer third annulus, said central first annulas and said intermediate second annulus being adapted to lie in operation opposite respective intermediate and outer annuli of said ring of said third series, and an outer third annulus circumscribed on said intermediate second annulus, said first, second and third annuli being electrically and mechanically joined at diametral attachment points.

25. Conductive ring according to claim 24, wherein in order to procure successive stacking of a pair comprising one third series ring and one annulus of a second series ring, two annuli of a second series ring and two third series rings being successively superposed, two annuli of a second series ring are formed in face-to-face relationship on opposite sides of an insulative material.

26. Conductive ring according to claim 25, wherein said two annuli of a second series ring formed on said insulative material are constituted by a double-sided printed circuit, said first, second and third annuli being in face-to-face relationship.

27. Conductive ring according to claim 25, wherein said outer third annuli comprise at their periphery two diametrally opposed mechanical drive and electrical connection tabs.

28. Conductive ring according to claim 25, comprising a layer of insulative material separating two consecutive rings in said stack.

29. Conductive ring according to claim 28, wherein said layer of insulative material is a film of mylar.

30. Conductive ring according to claim 28, wherein said rings comprise on the side of said first, second and third annuli opposite to said bosses a coating of electrically insulative material separating two consecutive rings and said layer of insulative material is constituted by said insulative coatings of said two rings in face-to-face relationship.

* * * * *